United States Patent [19]
Robinson

[11] Patent Number: 4,973,074
[45] Date of Patent: Nov. 27, 1990

[54] BICYCLE FRAME EXTENSION SYSTEM

[75] Inventor: Donald F. Robinson, 151 S. Craig Pl., Lombard, Ill. 60148

[73] Assignee: Donald F. Robinson, Lombard, Ill.

[21] Appl. No.: 327,082

[22] Filed: Mar. 22, 1989

[51] Int. Cl.⁵ .......................... B62B 7/00; B62K 7/02
[52] U.S. Cl. .................................... 280/658; 280/287
[58] Field of Search ................ 280/287, 638, 35, 657, 280/658, 278, 202, 7.1

[56] References Cited

FOREIGN PATENT DOCUMENTS

| 51929 | 8/1911 | Austria | 280/202 |
| 131669 | 8/1931 | Austria | 280/202 |
| 715356 | 12/1941 | Fed. Rep. of Germany | 280/202 |
| 307439 | 5/1933 | Italy | 280/202 |
| 111429 | 8/1944 | Sweden | 280/202 |
| 11444 | of 1894 | United Kingdom | 280/202 |
| 28592 | of 1913 | United Kingdom | 280/202 |
| 146042 | 12/1919 | United Kingdom | 280/202 |

Primary Examiner—Charles A. Marmor
Assistant Examiner—Alan M. Kagen
Attorney, Agent, or Firm—Donald F. Robinson

[57] ABSTRACT

A frame extension system for adapting male and/or female bicycles to support a child seated within a child carrier seat in a position in front of the rider, behind the handle bars, in order to maximize child safety and to maintain the center of gravity between the front and rear wheels.

10 Claims, 4 Drawing Sheets

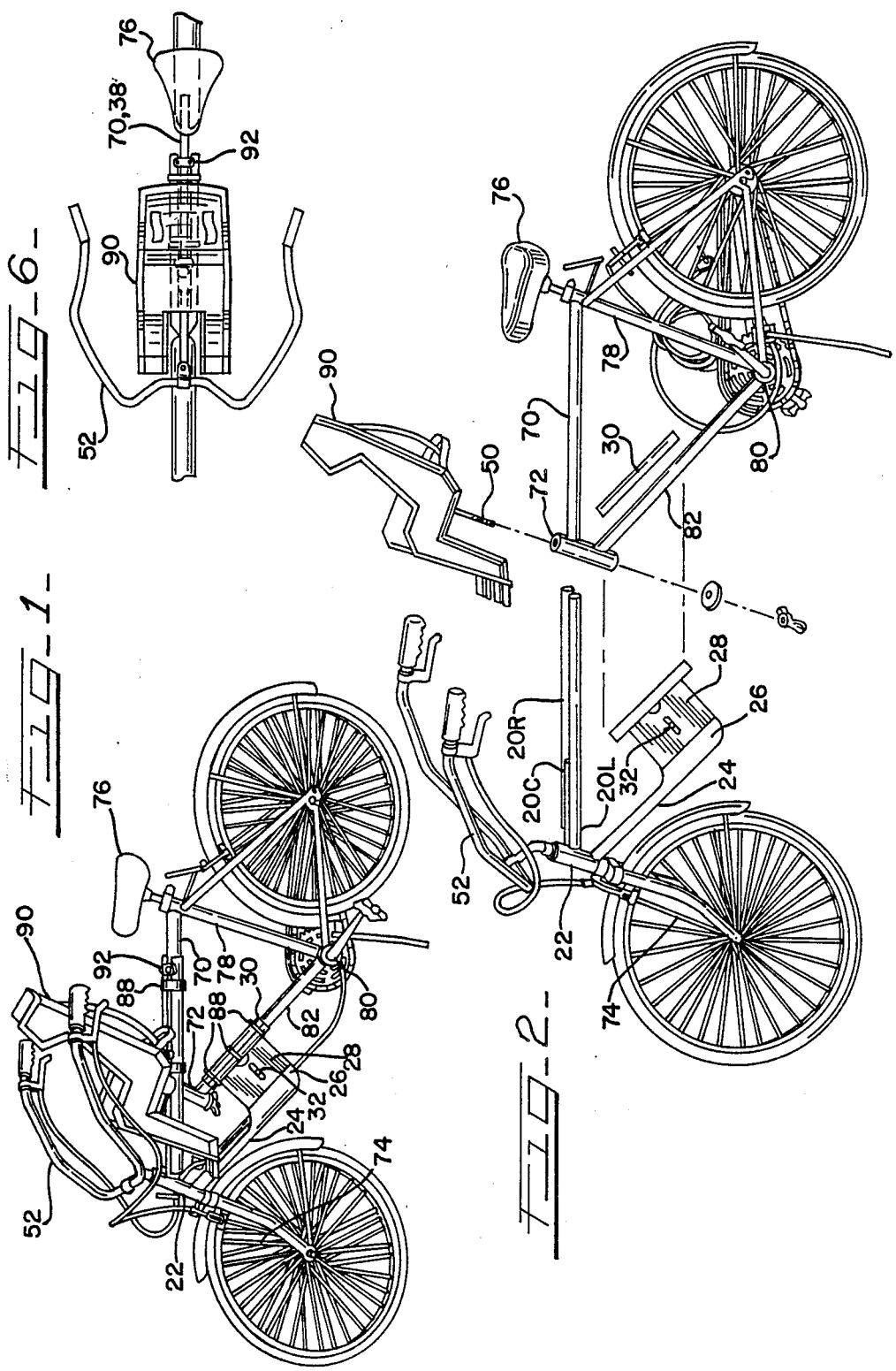

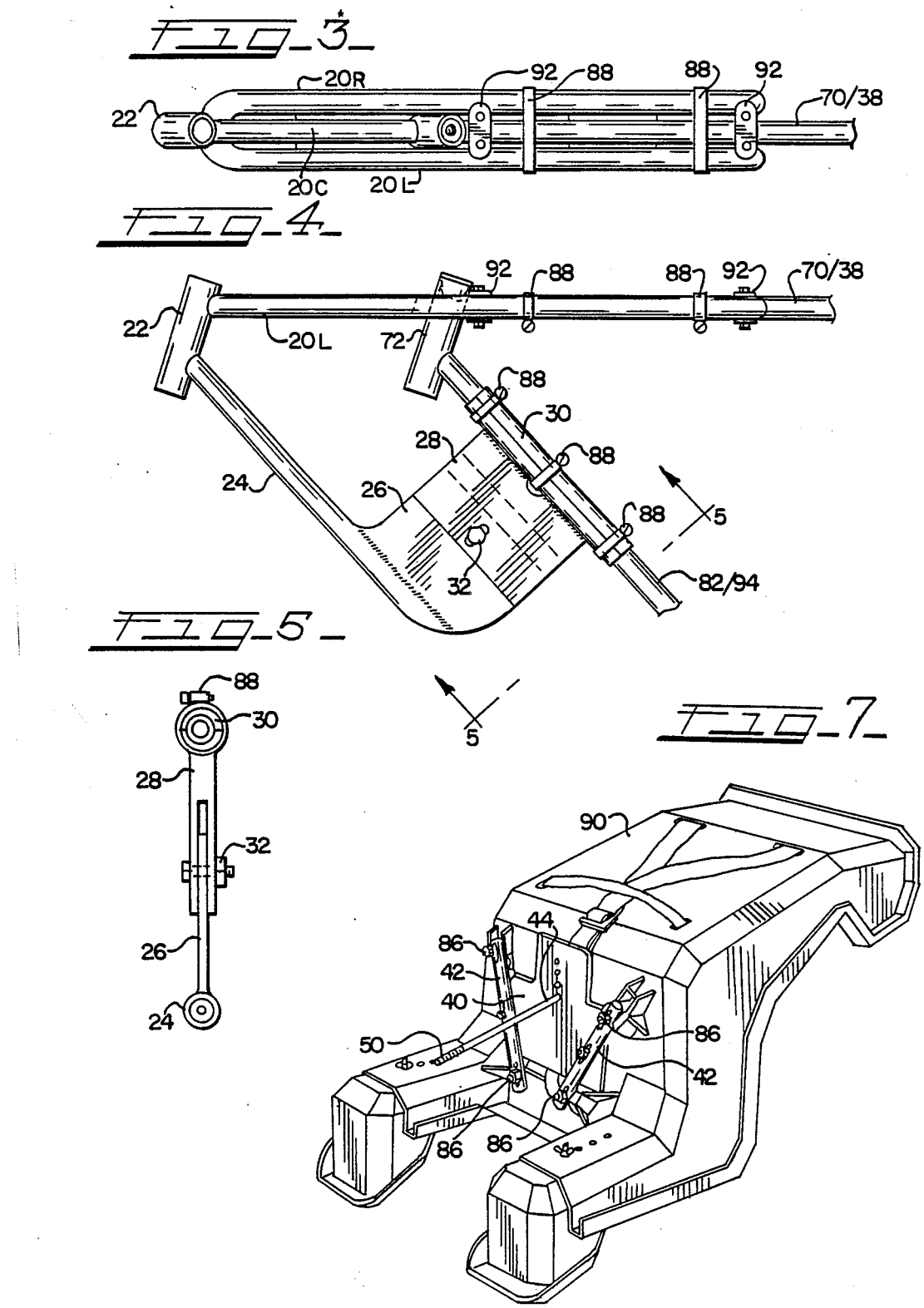

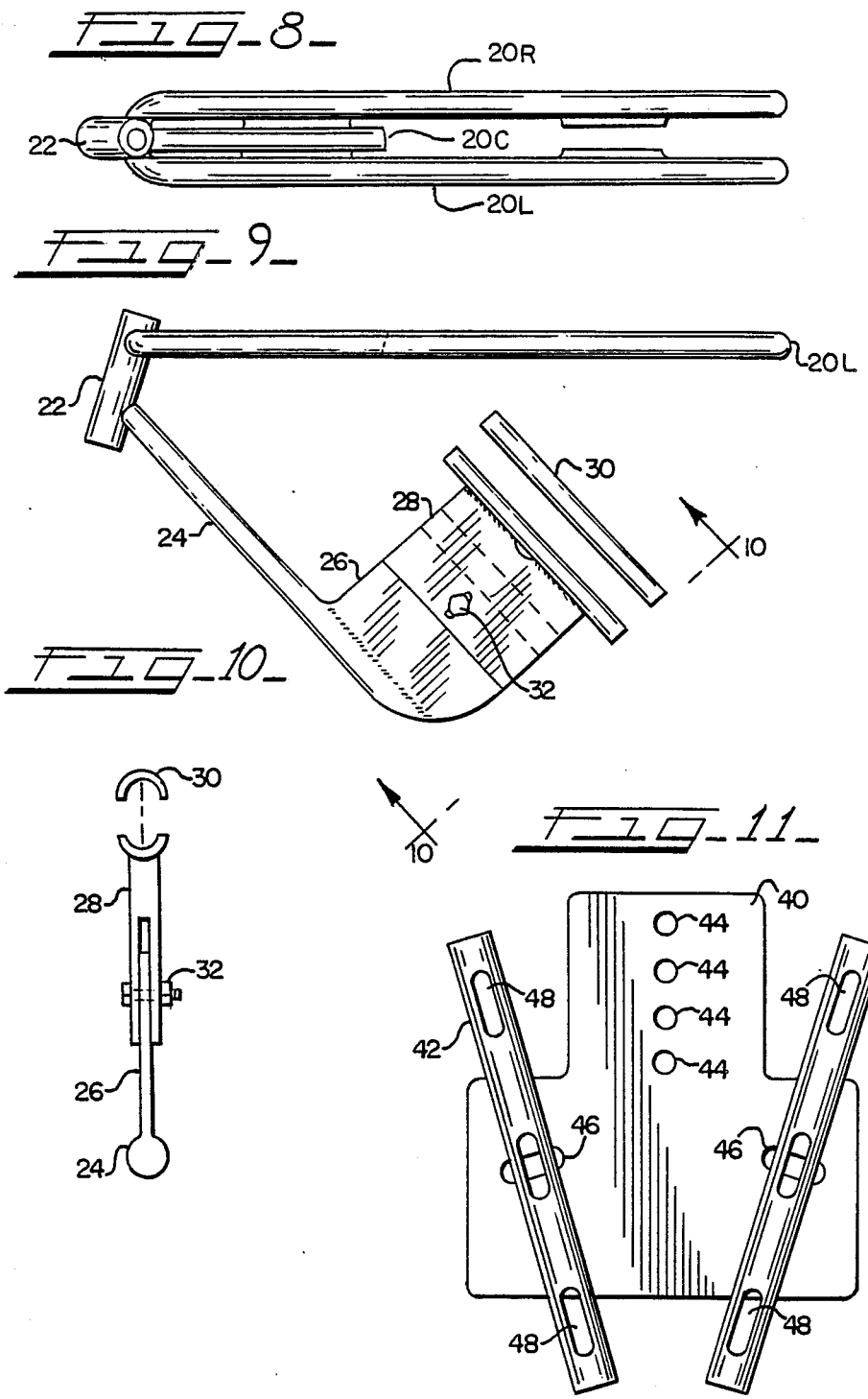

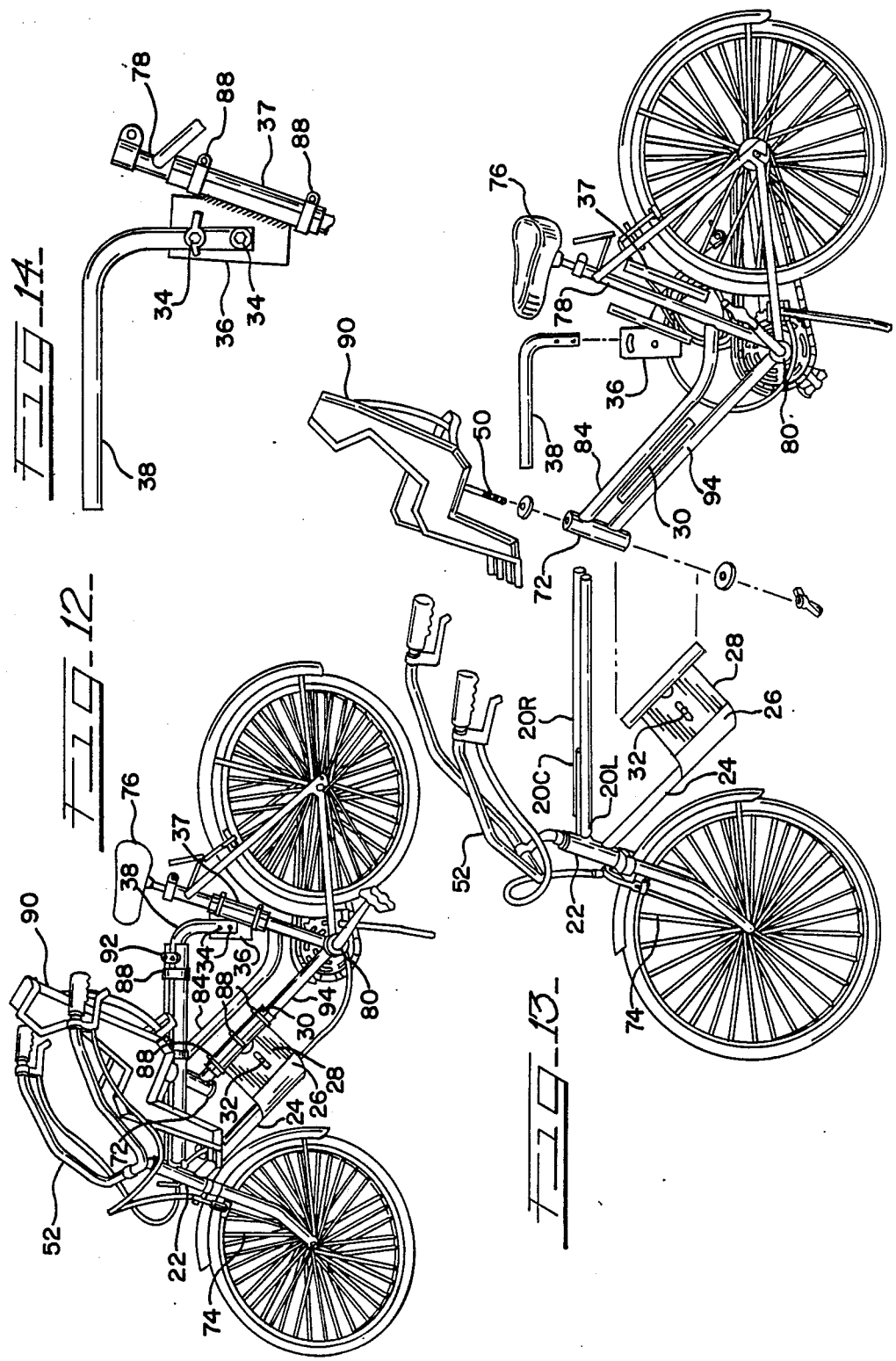

BICYCLE FRAME EXTENSION SYSTEM

BACKGROUND OF THE INVENTION

1. Field of the Invention

This invention relates to bicycles, specifically to an improved bicycle having an extendable frame assembly. The extendable assembly has the ability to utilize a male and/or female bicycle for the purpose of transporting a single rider and a young passenger such as a child riding safely in front of the cyclist.

2. Discussion of Prior Art

Only in the past dozen years or so has a bicycle rider been able to carry young children along to enjoy the great out-of-doors and freedom afforded to cyclists. A children's seat known as a child carrier is often mounted over the rear wheel and tire. In this position the cyclist cannot easily insure that the child is safe and comfortable, and in many cases a child could slip out of the seat or entangle legs or feet in the spokes of the rear wheel.

Inventors have made futile attempts at mounting substandard seat configurations on a horizontal tubular metal bar extending from a neck and trailing rearward to a tubular metal member supporting the seat assembly, e.g. U.S. Pat. No. 579,514 to Collins, U.S. Pat. No. 2,376,313 to Murrell, U.S. Pat. No. 2,550,200 to Murrell, and U.S. Pat. No. 3,738,704 to Smith in June of 1973. U.S. Pat. No. 3,743,321 to Luschen discloses a seat affixed to the gooseneck of the bicycle which moves simultaneously when steering. U.S. Pat. No. 3,902,737 to Berger and Welter provides a child's seat mounted at or near the handle bar which also moves simultaneously when steering. U.S. Pat. No. 4,305,532 to Reminger and U.S. Pat. No. 4,632,453 to Robin and Robin also provides a seat mounted on a horizontal tubular metal bar. None of the above mentioned patents provide adequate seating arrangements, proper security and safety or quality comfort for a child or passenger, and much less the cyclist's propelling the vehicle, because the cyclist knees may contact the child rider/seat and require alterations of pedaling strides, and also interfere with the steering and stability of the vehicle, especially when the seat assembly is attached to the handlebar and/or gooseneck assembly.

Considering all of the problems and potential problems that occur with the previously mentioned patents, this present invention eliminates most of the risk factors because a child can be seated in an approved Child Carrier seat which is mounted in front of the cyclist for close viewing and greater stability. Moreover the seat is easily removed and installed.

The following discloses various types of bicycle constructions, frames, chassis structures and the like: U.S. Pat. Nos. 4,390,191 bicycle construction, 4,368,897 bicycle frame structure, 4,047,731 bicycle frame, 3,931,990 bicycle, 3,865,402 bicycle, U.S. Pat. Design Nos. D-293,660 bicycle, D-292,074 bicycle frame, D-290,592 bicycle frame, D-289,857 bicycle chassis, D-284,646 bicycle frame, D-279,324 bicycle frame, D-277,744 bicycle frame, D-259,482 bicycle frame, D-251,185 bicycle frame, D-244,593 bicycle frame, and D-244,266 bicycle frame.

OBJECTS AND ADVANTAGES

It is an object and advantage of the present invention to provide a new and improved extendable bicycle frame system, and more particularly a frame extension for adapting an existing bicycle to carry a child in a seat supported on the frame in front of the cyclist.

Another object is to provide a frame extension adapted for supporting existing child carrier seats in a safer manner and a system whereby the carrier seat is easily removed and/or installed in a simple manner within a matter of minutes using only standard tools normally on hand in most households. Another object is to provide a frame extension and child carrier seat in combination which provide much greater bicycle stability than rear mounted seats of prior art. Further objects and advantages of the present invention will be obvious from the following description and accompanying drawing.

BRIEF SUMMARY OF THE INVENTION

The foregoing and other objects and advantages of the present invention are accomplished in a new and improved bicycle frame extension system for supporting a child carrier seat forwardly of the rider and rearwardly of the handle bars so as to maintain a loaded center of gravity well centered between the wheels, which will provide improved stability and handling.

The frame extension system includes a frame extender, for detachable interconnection with the frame of an existing male or female bicycle of the type having a frame with a steering column support, a seat column support and at least one frame member interconnecting said supports. The frame extender includes a forward steering column support for receiving the steering assembly taken from the existing bicycle after removal from the steering column support thereof and a pair of upper and lower frame extender members projecting rearwardly thereof. Upper and lower clamping elements are detachably interconnectable with said respective upper and lower frame extender members and the seat column support and at least one frame member of the existing bicycle frame respectively. A support is provided for detachable mounting and supporting a child carrier seat in the steering column support of the bicycle frame between the forward steering column support of the frame extender and the seat column support of the frame. Elongated handlebars are pivotally supported from the forward steering support column of the frame extender and extend rearwardly on opposite sides of the child carrier seat. Controls are mounted on the rearward end portions of the handlebars and are connected to their respective areas (e.g. brakes, shifters, derailers) through elongated flexible cables.

BRIEF DESCRIPTION OF THE DRAWINGS

For a better understanding of the present invention reference should be made to the following detailed description taken in conjunction with the drawing, in which:

FIG. 1 is a side view of a typical male bicycle having a frame extension system with the present invention installed and a child carrier securely in place thereon;

FIG. 2 is an exploded side view illustrating the frame system of the present invention and a bicycle in a partially disassembled condition;

FIG. 3 is a fragmentary top plan view illustrating the frame system of the present invention installed on a male bicycle and/or a female bicycle;

FIG. 4 is an enlarged, detailed side view illustrating an extendable frame system of the invention secured to a male bicycle and/or a female bicycle frame;

FIG. 5 is a cross sectional view taken substantially along lines 5—5 of FIG. 4;

FIG. 6 is a top plan view of a male and/or female bicycle depicting modified handlebar assembly in accordance with the invention and a child carrier seat mounted on the frame;

FIG. 7 is an isometric view of the underside of a typical child carrier seat with a universal seat attachment and mounting assembly for the purpose of securing the seat to a male/female bicycle;

FIG. 8 is a top plan view of an extendable frame assembly in accordance with the invention;

FIG. 9 is a side view of the extendable frame assembly of FIG. 8;

FIG. 10 is a front end view of the extendable frame assembly of FIG. 8;

FIG. 11 is a bottom view of a seat attaching bracket assembly for mounting a child carrier seat on the extendable frame assembly;

FIG. 12 is a side view illustrating a typical female bicycle having a frame extension system of the present invention installed with a child carrier seat secured in place;

FIG. 13 is an exploded side view illustrating the extendable frame system of the present invention and a female bicycle in a partially disassembled condition; and FIG. 14 is a side view of a universal adjustable frame extension assembly in accordance with the invention adapted for use with a female bicycle.

DETAILED DESCRIPTION OF INVENTION

Referring now more particularly to the drawing. All angle measurements are based on compass headings where zero degrees is vertical. FIGS. 1 and 12 illustrate typical adult male and adult female bicycles, respectively. A tubular metal horizontal member 70 of the male bicycle extends from the upper portion of a tubular metal neck 72 which previously housed bearings, races and a steering fork assembly 74, (relocated within tubular metal neck 22,) rearwardly to a near vertical tubular metal member (at an approximate 18° angle) 78 which houses an adjustable seat assembly 76 mounted at the upper end. A cranking mechanism and housing 80 including bearings, races, nuts, and washers is provided at the lower end of the tubular metal member 78, and an additional tubular metal member 82 of the male bicycle and 94 of the female bicycle closes the circuit of the bicycle frame by running at an approximate 315° angle from the cranking mechanism and housing 80 upwardly to the lower portion of the tubular metal neck 72.

FIG. 13 illustrates tubular metal member 94 connecting with the lower portion of tubular metal neck 72, and extending downwardly and rearwardly to the forward most part of the cranking mechanism and housing 80. Tubular metal member 78 connects to the rear most part of cranking mechanism and housing 80, and extends upwardly and rearwardly as the means for a seat support. Tubular metal member 84 connects with the upper portion of tubular metal neck 72 paralleling tubular metal member 94 and connects to tubular metal member 78 somewhat near the cranking mechanism and housing 80, of a female bicycle.

FIG. 14 illustrates a "bicycle frame extension system bracket" necessary to adapt a female bicycle into the bicycle frame extension system. The vertical adjustable bracket 36 secures to the vertical tubular metal member 78 using stainless steel worm type clamps 88 to secure clam shell half 37 to the vertical adjustable bracket 36. The horizontal/vertical angled tubular metal member 38 is secured to the vertical adjustable bracket 36 with bolts, washers, lock washers and nuts 34. The lower bolt, washer, lock-washer, and nut 34 of the "universal adjustable frame extension assembly bracket" 36 acts as a fulcrum/pivot point allowing the horizontal/vertical angled tubular metal member 38 to move freely by seeking the exact position within the curved slotted section of the vertical adjustable bracket 36 to insure correct alignment with upper frame extender members 20L, 20C, and 20R as illustrated in FIGS. 8 and 9. Please note that wherever any mentioned sections of tubular metal joins another section of tubular metal, these joints and/or mating surfaces are joined by a highly technical welding system unless otherwise noted, e.g. nuts/bolts and clamps.

FIGS. 1 and 12, side view illustrations of the embodied invention, earlier referred to as "bicycle frame extension system," are shown fully assembled, i.e. FIG. 1 being the male bicycle and FIG. 12 being the female bicycle.

FIGS. 8, 9, and 10 illustrate the plan view, exploded view and end view respectively of the "bicycle frame extension system." FIG. 8 illustrates upper frame extender members 20L (left) 20C (center) and 20R (right) extending rearwardly from tubular metal neck 22 to join with tubular metal member 70 (male bicycle) or tubular metal member 38 (female bicycle). They are secured with support assemblies 92 (consisting of flat heavy guage steel strapping secured to the upper and lower portions of 20L, 70 and/or 38, and 20R including nuts, bolts, washers and lockwashers) to eliminate the possibility of any vertical movement between frame assemblies. They are also secured with stainless steel worm type clamps 88, which eliminate the possibility of any horizontal movement between frame assemblies. Lower frame extends member 24, extending 138° downwardly and rearwardly from tubular metal neck 22, equipped with slotted male member 26, attaches within the adjustable slotted female member. Clam shell half 28 will fit halfway around tubular metal members 82 and/or 94 to be secured with the removable clam shell half 30 by stainless steel worm type clamps 88. Once all of the above members are in perfect alignment and secured, a final tightening of all nuts, bolts, washers and lockwashers 32 and 34 is completed.

FIGS. 3, 4, and 5 illustrate top, side and end views respectively of the totally assembled units of the "bicycle frame extension system," devoid of all attaching members e.g. handle bar, fork, wheels and tires, etc., to illustrate the actual invention with the necessary hardware that changes an ordinary male and/or female bicycle into a "bicycle frame extension system".

FIG. 7 illustrates an isometric view of the child carrier 90 depicting the universal fits-all child carrier seat bracket assembly attached to the bicycle as illustrated in FIG. 11. FIG. 11 illustrates the bottom view of the universal fits-all child carrier seat bracket assembly 40 and 42, (devoid of all nuts, bolts and washers, AKA attaching hardware). Four (4) drilled bolt positioning mounting holes 44 allow for the fore and aft child carrier seat adjustments. Slotted holes 46 allow the narrowing or widening of the slotted tubular steel members 42. Slotted holes 48 located in the fore and aft section of the tubular steel members 42 thus allow for the attachment of the child carrier seat to the tubular steel members 42 using standard hardware 86 (e.g. carriage bolts, washers, lockwashers and nuts, all a part of the child carrier seat assembly 90). The main attaching bolt assembly 50 secures the child carrier seat via the universal fits-all bracket assembly mounting hole 44 and through the tubular metal neck 72, using cupwashers, a lock-washer and a wing nut.

FIG. 6 illustrates the top of the embodiment with the modified handle bar 52 depicting the extension needed to compensate for the added length of the now "bicycle frame extension system."

OPERATION OF THE INVENTION

Making reference to FIGS. 1 and 12, the drawings illustrate the male and female bicycles respectively embodying the invention. By utilizing the male and/or female bicycles as illustrated in FIGS. 1 and 12, the embodied "bicycle frame extension system" shows the relocated child carrier seat from the rear of the bicyclist to the front of the bicyclist. Also included in the above-mentioned installation is the necessary replacement of the front and rear brake cables, including the cable(s) for the shift controls in bicycles of various speeds (e.g. 3-speed, 5-speed, 10-speed, etc.) due to the lengthening of the redesigned handle bar. Not shown in the total embodiment of FIGS. 1 and 12 is the "universal fits-all child carrier seat attaching bracket assembly" depicted in the bottom view FIG. 11 and shown in the assembled position of the isometric view FIG. 7.

It is also noted that the adaptation of the "universal adjustable frame extension assembly" FIG. 14 is required in conjunction with "bicycle frame extension system" FIG. 8 plan view and FIG. 9 side view that make up the female "bicycle frame extension system" depicted in FIG. 12. Additionally, the operation of the "bicycle frame extension system" versions of the male and/or female bicycles incorporated with the child seated in the child carrier seat is almost identical with that of any standard male and/or female bicycle without the child and/or child carrier seat configuration.

The bicyclist can, without hesitation or reservation, mount and dismount the vehicles mentioned in a fashion known the world over, namely mounting from the left side (or right as necessary) by swinging the leg up, over, and around, like mounting a horse, in addition if need be by instinct, the bicyclist can dismount in a forward fashion straddling the horizontal bar(s) 70/38 including 20L, 20C, 20R with both feet now on solid ground and with a child still safely secured in the child carrier seat should an emergency require that action.

Functionally, the embodied vehicles carry the bicyclist and the child passenger much like in times past. It is stressed here that the child is still seated in a standard child carrier seat, but this invention incorporates an entirely new concept in bicycling, and has revolutionized the child-carrying mode of transportation, with the child now having a "front row seat."

Readers of this invention should not construe what has been written heretofore as limitations on the scope of this invention but exemplification of the preferred embodiments thereof. Those of you that are skilled in the art will envision other possibilities with some variations within its scope. For example, possibilities exist in the ability to change some of the dimensions, shapes, etc. of the embodiments by adding length in one area and/or shortening an item elsewhere. Accordingly, the scope of this invention should be determined not only by the embodiments illustrated within the fourteen (14) figured drawings but also the appended claims and their legal equivalents.

I claim:

1. A bicycle frame extension system for an existing bicycle frame of a bicycle of the type including a steering column support, a seat column support and at least one frame member interconnecting said supports, the improvement comprising:

a forward steering column support for receiving a steering assembly taken from said existing bicycle after removal from said steering column support thereof, and a pair of upper and lower frame extender members attached to and projecting rearwardly and downwardly of said forward steering column support, an upper clamping element consists of a pair of extender frame members projecting rearwardly on a horizontal plane from said forward steering column support, and parallelling an interconnecting frame member extending between said steering column support and said seat column support of said upper frame extender members with clamps and brackets clamping said frame members, a lower clamping element consists of a single frame extender member projecting rearwardly and downwardly of said forward steering column support supports a fixed plate with an adjustable bracket extending upwardly 90° from said single frame member secured to parallelling single frame member of said existing bicycle by means of clamps clamping clam shell halves together;

upper and lower clamping elements for detachably interconnecting said upper and lower frame extender members respectively for support from said seat column support and a one piece frame member respectively, and support means mountable in said steering column support for supporting a child carrier seat between said seat column support of said frame and said forward steering column support of said frame extender.

2. The frame extension system of claim 1 wherein; said existing bicycle comprises a male bicycle having a horizontal frame member interconnected between said steering column support and said seat support, and said upper clamping element is secured to said horizontal frame member; and said existing bicycle having a frame member interconnected between said steering column support and a cranking mechanism, and said lower clamping element is secured to said parallelling interconnected frame member.

3. The frame extension system of claim 1 wherein; said existing bicycle comprises a female bicycle; and said upper clamping element includes means interconnectable to said steering column support of said bicycle frame and secured to said horizontal frame member of said bicycle frame extension system by means of clamps and brackets clamping said frame members together, whereas the lower section of said bicycle frame extension system is secured to said existing bicycle frame member extending between said seat column support and said cranking mechanism by means of clamps clamping clam shell halves together, and said lower clamping element of said frame extender member secures to said frame member extending from said steering column support and said cranking mechanism of said existing bicycle by means of clamps clamping clam shell halves together; and support means mountable in said steering column support for supporting a child carrier seat between said seat column support of said frame and said forward steering column support of said frame extender.

4. The frame extension system of claim 1, including; handle bar means supported for pivotal movement in said steering column support of said frame extender, said handle bar means including a pair of elongated rearwardly extending handle bars on opposite sides of said child carrier seat secured within the steering column support of said existing bicycle for steering said bicycle.

5. The frame extension system of claim 4, including; one or more elongated, flexible control cable means extending between a wheel of said existing bicycle and a hand lever detachably mounted on a rearward end portion of at least one handle bar for controlling gear shifting and/or braking of said bicycle.

6. The frame extension system of claim 2, wherein; said upper frame extender members of said frame extension system extending from said forward steering column support rearwardly of said steering column support of said existing bicycle on opposite sides of said horizontal frame member of said existing bicycle frame; and wherein; said upper clamping element is positioned between said forward steering column support and said seat column support of said existing bicycle frame for securing said pair of tubular elements to said frame member therebetween.

7. The frame extension system of claim 6, wherein; said lower frame extender member extends rearwardly and downwardly of said forward steering column support, and wherein said lower clamping element is positioned to clamp a rearward end portion of said lower frame extender member to a second frame member of said bicycle frame interconnected between said steering column support and said bicycle frame.

8. The frame extension system of claim 3, wherein; said upper frame extender member includes a pair of tubular elements extending from said steering column support rearwardly of said steering column support of said bicycle frame on opposite sides thereof, and wherein upper clamping element of said bicycle frame extension system bracket is clamped to said frame members of said frame extension system, and said lower clamping element of said bicycle frame extension system bracket is clamped to said seat support column of said existing bicycle frame.

9. The frame extension system of claim 8, wherein; said lower clamping element includes an L-shaped tubular member having a horizontal leg clamped to said pair of tubular elements and a vertical leg interconnected with said seat support column of said existing bicycle frame.

10. The frame extension system of claim 9, including; modifying said frame extension system and said existing bicycle with said bicycle frame extension system bracket by means of multiple adjustments to the upper and lower clamping elements.

* * * * *